April 21, 1964 R. R. SZATKOWSKI 3,129,978
AIR CONVEYOR FOR CAN BODIES
Filed Feb. 20, 1961 3 Sheets-Sheet 1
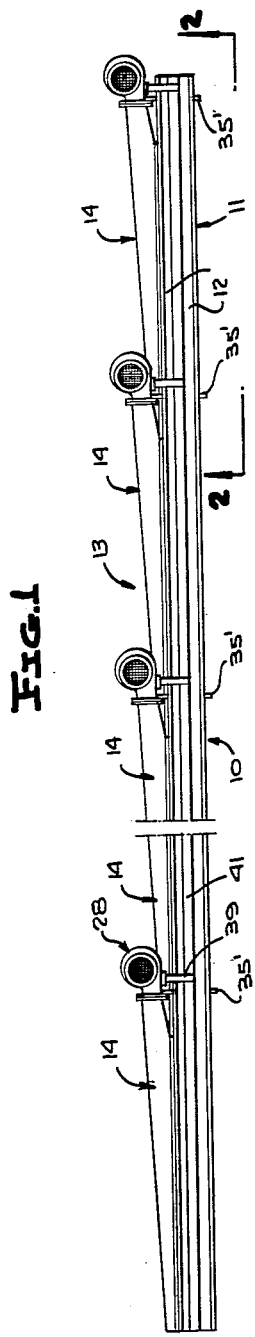
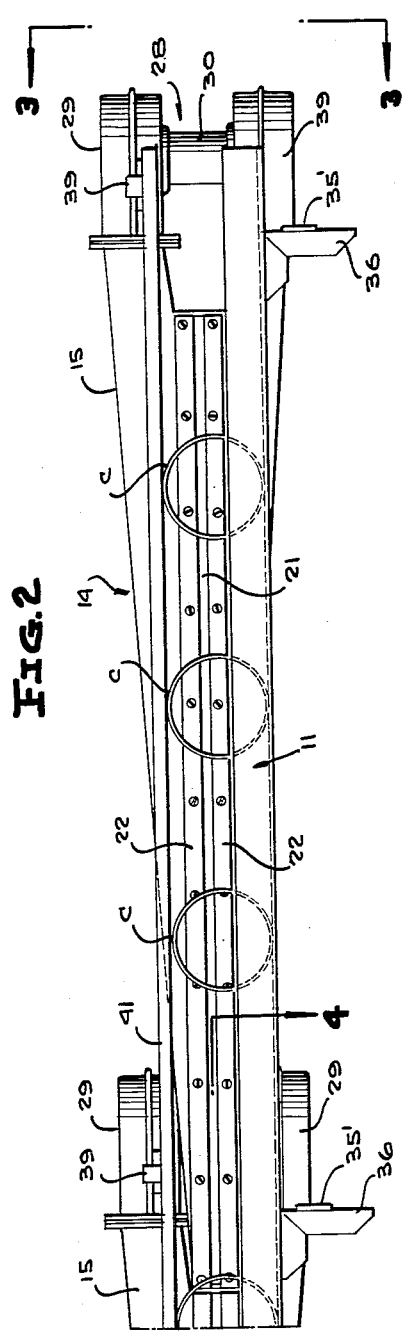
INVENTOR.
RICHARD R. SZATKOWSKI
BY
Mason, Porter, Diller & Stewart
ATTORNEYS

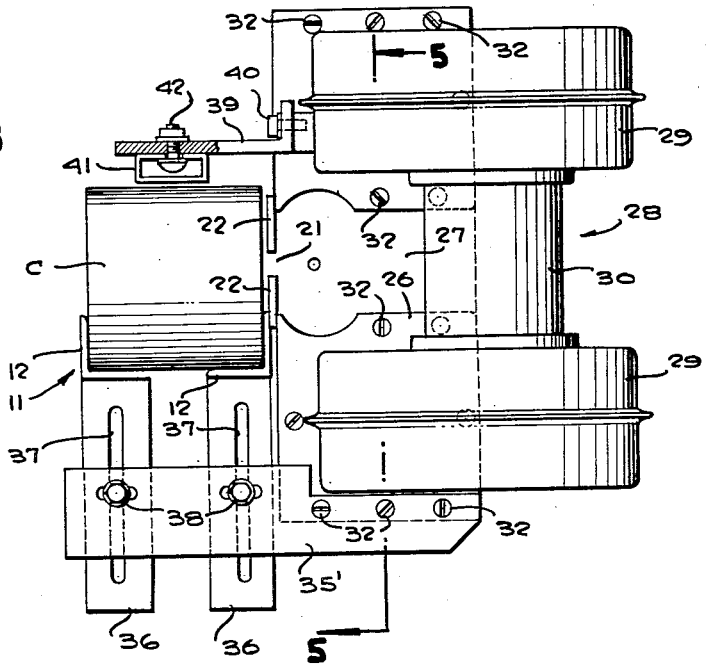
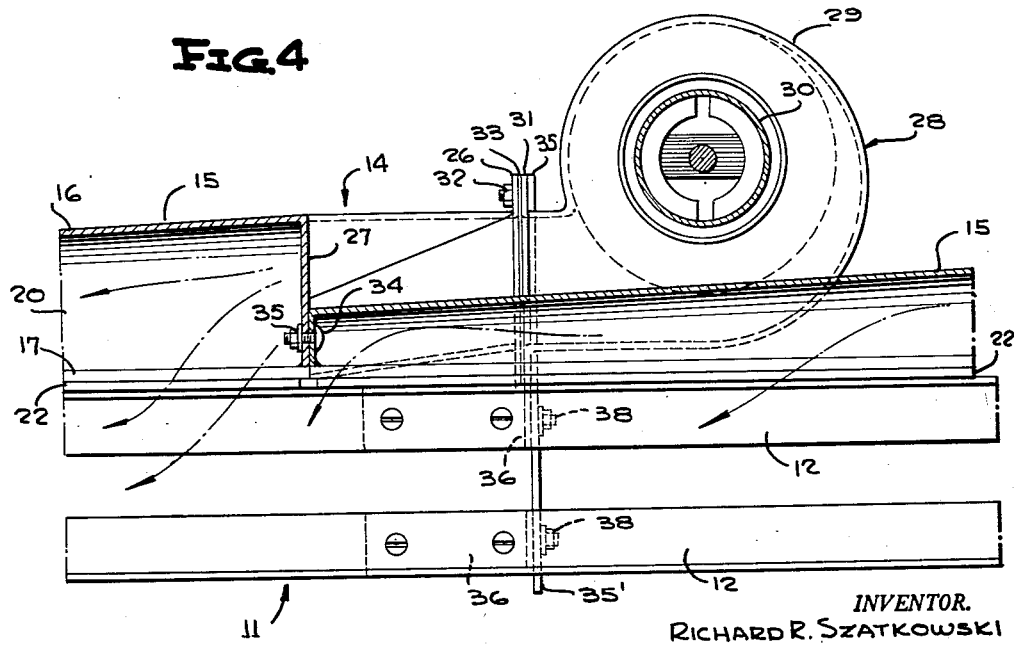

April 21, 1964 R. R. SZATKOWSKI 3,129,978
AIR CONVEYOR FOR CAN BODIES
Filed Feb. 20, 1961 3 Sheets-Sheet 3
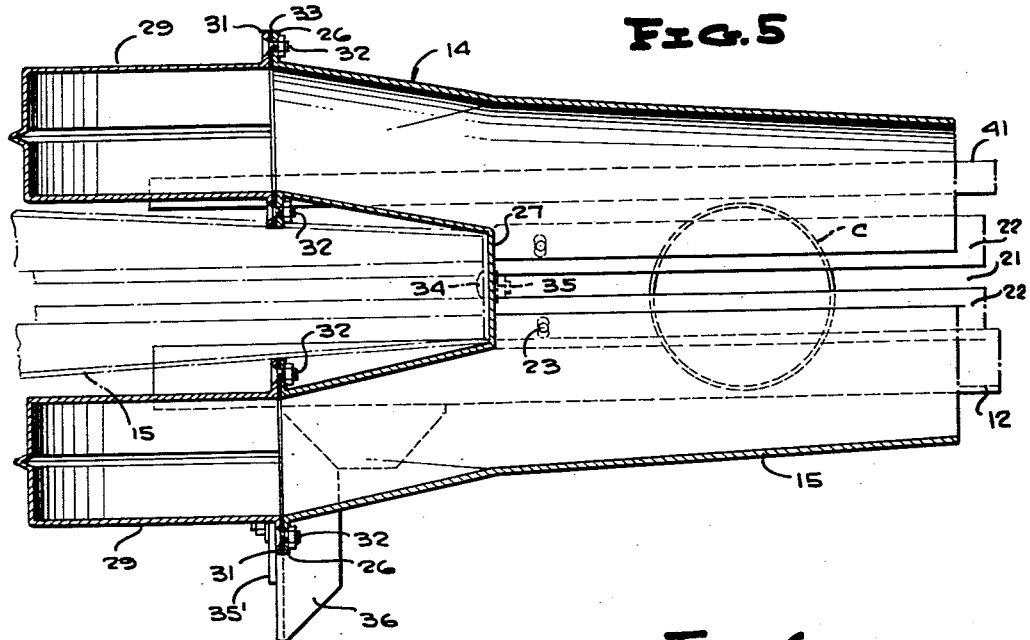
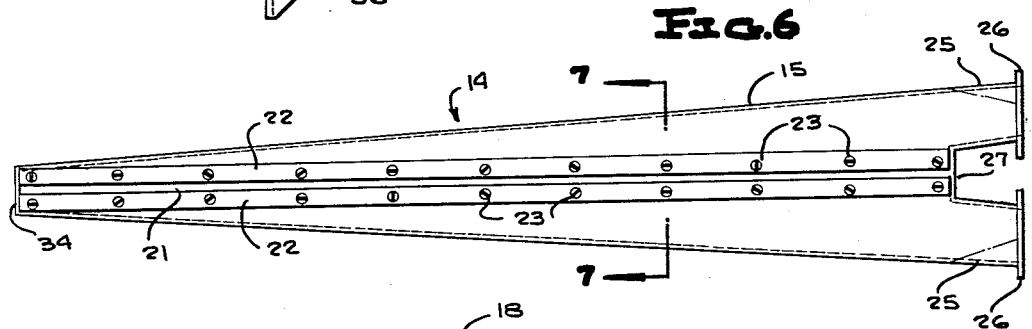
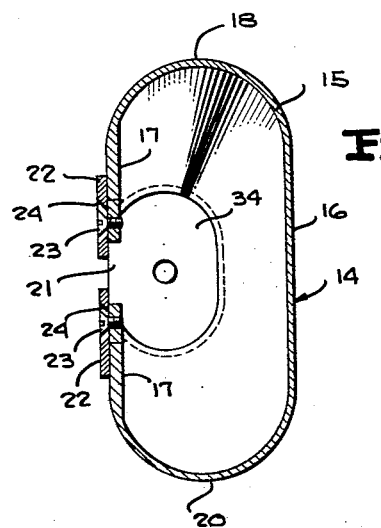
INVENTOR.
RICHARD R. SZATKOWSKI
BY
Mason, Porter, Diller & Stewart
ATTORNEYS United States Patent Office 3,129,978
Patented Apr. 21, 1964

3,129,978
AIR CONVEYOR FOR CAN BODIES
Richard R. Szatkowski, Western Springs, Ill., assignor to Continental Can Company, Inc., New York, N.Y., a corporation of New York
Filed Feb. 20, 1961, Ser. No. 90,489
11 Claims. (Cl. 302—2)

This invention relates in general to new and useful improvements in conveyors, and more particularly to a novel air conveyor for can bodies which is particularly adapted for conveying large diameter can bodies, such as coffee can bodies.

At the present time, coffee can bodies are conveyed by a gravity runway. When utilizing such a runway, it is necessary for the runway to be disposed at such a pitch that when cans accumulate on the runway and then are subsequently released, they move at such speed that when they impinge the cans that have preceded them, the can bodies are frequently deformed or otherwise damaged.

It is therefore the primary object of the present invention to provide a novel conveyor particularly adapted for conveying coffee can bodies in a manner which will prevent the accumulation of the coffee can bodies and the impingement of one coffee can body against the other in a manner so as to damage the same.

Another object of the invention is to provide a coffee can body conveyor which includes a runway having a very small pitch, which pitch is insufficient to cause the can bodies to roll along the runway by gravity, and to provide air conveying means associated with the runway for moving the can bodies therealong.

Another object of the invention is to provide a novel conveyor for open ended can bodies, such as coffee can bodies, the conveyor including a runway or track along which can bodies may roll, and an air duct disposed adjacent the track, with the air duct having an air discharge slot therein extending substantially the full length thereof, and air under a slight pressure passing through the air discharge slot generally longitudinally of the conveyor to impinge against can bodies carried by the track and roll such can bodies along the track.

A further object of the invention is to provide a novel air conveyor for can bodies, the conveyor including a track having an air duct disposed therealong and the air duct being arranged to supply air moving generally longitudinally of the track to impinge against can bodies resting upon the track and to move the can bodies along the track, the duct being formed of a plurality of identical sections each of which is tapered and is provided at the large end thereof with a blower, the taper of the air duct section being such as to provide a substantially equalized pressure throughout the length of the air duct section.

Still another object of the invention is to provide a novel air duct for use in conveyors and the like, the air duct being formed of a plurality of identical sections, each of the sections having a bifurcated end carrying a blower, and a reduced other end, the reduced other end of the next preceding air duct section fitting within the bifurcated end of the next following air duct section and being secured thereto.

A still further object of this invention is to provide a novel air duct section which may be coupled together in units to provide an elongated air duct, the air duct section having an enlarged end which is bifurcated and on which there is mounted a blower assembly including two spaced apart blower units driven by a single motor.

With the above, and other objects in view that will hereinafter appear, the nature of the invention will be more clearly understood by reference to the following detailed description, the appended claims and the several views illustrated in the accompanying drawings.

In the drawings:

FIGURE 1 is a plan view of an air conveyor for can bodies in accordance with the invention, an intermediate portion of the conveyor being broken away.

FIGURE 2 is an enlarged fragmentary elevational view taken generally along the plane of the line 2—2 of FIGURE 1 and shows specifically the details of the conveyor, cans being moved by the conveyor being illustrated.

FIGURE 3 is an enlarged end view of the conveyor, taken generally along the line 3—3 of FIGURE 2, and shows the general details of the connections between the various components of the conveyor.

FIGURE 4 is an enlarged fragmentary longitudinal vertical sectional view taken along the line 4—4 of FIGURE 2 and shows the specific details of the connections between ends of two adjacent air duct sections.

FIGURE 5 is an enlarged fragmentary longitudinal sectional view taken along the line 5—5 of FIGURE 3 and shows the specific connection between two adjacent air duct sections.

FIGURE 6 is an enlarged elevational view of one of the air duct sections removed from the remainder of the conveyor.

FIGURE 7 is an enlarged transverse vertical sectional view, taken along the line 7—7 of FIGURE 6, and shows the specific details of one of the air duct sections including the details of adjustable plates for varying the size of the air discharge slots formed therein.

Reference is now made to the drawings in detail, wherein there is illustrated in FIGURE 1 an air conveyor formed in accordance with this invention, the air conveyor being generally referred to by the numeral 10. The air conveyor 10 includes a runway or track 11 which is formed of a pair of angle members 12, 12 which have their horizontal flanges in alignment and their vertical flanges in spaced relation. The runway or track 11 has a very slight pitch, the pitch being about two inches in every ten feet, which is insufficient to cause can bodies to roll along the runway by gravitational force.

An air duct, generally referred to by the numeral 13, extends alongside the runway 11 to provide the propelling force for can bodies, such as the can bodies C illustrated in FIGURE 2. The air duct 13 is formed of a plurality of identical sections, the individual sections being generally referred to by the numeral 14. Since the air duct sections 14 are identical, only the details of one of the air duct sections 14 will be described hereinafter.

Reference is now made to FIGURES 6 and 7 in particular, wherein it will be seen that there is illustrated a duct member 15 which makes up the major part of each air duct section 14. The duct member 15, as is best shown in FIGURE 7, is generally oval in cross-section and includes a rear wall 16 and a fragmentary front wall defined by a pair of aligned spaced front wall portions 17. The front wall portions 17 are connected to the rear wall 16 by an upper wall portion 18 and a lower wall portion 20, the wall portions 18 and 20 being generally semi-circular in cross-section. It is also to be noted that the wall portions 17 are relatively thick as compared to the other walls of the duct member 16 to facilitate the securement of articles thereto.

The spacing of opposed edges of the duct wall portions 17 defines an air discharge slot 21. The size of the air discharge slot 21 is varied by means of plates 22, 22 which are secured to the outer faces of the wall portions 17. The plates 22 are mounted on their respective wall portions 17 by means of screws 23 which pass through slots 24 formed in the plates 22. Thus, the plates 22 are vertically adjustable to vary the width of the air discharge slot 21.

It is to be noted that when the air duct member 15 is in an upright position, the air duct member 15 tapers from the right end thereof (FIGURE 6) to the left end thereof in a vertical manner, with the taper being symmetrical with relation to a horizontal plane passed through the center of the air discharge slot 21. It is also to be noted that the air duct member 15 tapers in width.

The air duct member 15 has a bifurcated end portion which includes a pair of duct extensions 25 which terminate at their free ends in flanges 26. The duct extensions 25 are disposed in the form of a bifurcated portion of the duct member 15 and are separated from one another. The end portion of the duct member 15 also includes a recessed intermediate end wall portion 27.

As is best shown in FIGURE 2, each of the air duct sections 14 has a blower assembly, generally referred to by the numeral 28, secured to the bifurcated end thereof. The blower assembly 28 includes a pair of spaced blower units 29 which are connected together by an electric motor 30, the electric motor 30 connecting together and simultaneously driving the blower units 29.

Reference is made to FIGURE 5 in particular, wherein it will be seen that each of the blower units 29 is provided with a mounting flange 31. Fasteners 32 extend through the mounting flange 31 and secure the blower unit 29 to the mounting flange 26. A suitable gasket 33 is disposed between the flanges 31 and 26.

Reference is again made to FIGURE 6, wherein the details of the taper of the duct member 15 are shown. It is to be noted that the duct member 15 tapers from the blower end thereof to the other end thereof, and terminates in an end wall 34, which is relatively small.

When it is desired to assemble a pair of the duct members 15, the duct members 15 are aligned with the reduced end portion of a preceding one of the duct members extending between the two blower units 29 of the following duct member and abutting against the end wall 27. The end walls 27 and 34 are secured together in nested relation by means of a fastener 35 passing therethrough.

Reference is now made to FIGURES 3 and 4, wherein the details of the connection between each air duct section 14 and the runway or track 11 are shown. A cross-bar 35' is suitably secured to the lowermost mounting flange 26 by the same fasteners 32 which are utilized to secure the air duct sections 14 together. Suitable support straps which are best shown in FIGURES 2, 3, and 5 are secured to the angle members 12, each support strap being referred to by the numeral 36. The support straps 36 are provided with elongated slots 37 which receive adjustable fasteners 38 carried by the crossbar 35'. In this manner, the runway or track 11 is supported at the desired elevation with respect to the air duct 14.

The runway or track 11 is vertically adjusted until the air discharge slot 21 is aligned generally with the centers of the can bodies C, as is best shown in FIGURE 3.

An upper support arm 39 is suitably secured to the upper blower unit 29 by means of a fastener 40, in the manner best shown at the top of FIGURE 3. A continuous C-shaped channel member 41 is secured to the undersides of the support arms 39 of the various air duct sections 14 by means of fasteners 42. The C-shaped member 41 is spaced slightly above the path of the can bodies C and serves the purpose of preventing the can bodies C from jumping out of the track or runway 11.

The supports for the conveyor have not been illustrated. The conveyor may be supported in any desired manner. Further, it is to be understood that the length of the conveyor may be any desired, in that each of the air duct sections 14 is self-contained. It is merely necessary for the desired number of air duct sections 14 to be assembled to provide the necessary length of conveyor 10.

In the use of the conveyor 10, can bodies, such as the coffee can bodies C, are delivered to the intake end of the conveyor 10 from suitable machinery (not shown). As the can bodies C pass onto the track 11, they move into the path of the air being discharged through the air discharge slot 21 of the first air duct section 14. Since the air flow out through the discharge slot 21 of each air duct section 14 is primarily longitudinal, it will be seen that the impingement of this air on a can body will move the can body longitudinally along the runway 11. Due to the tapered construction of each duct member 15, it will be seen that substantially the same volume of air continuously escapes along the full length of each of the air discharge slots 21. Further, as indicated in FIGURE 4, by telescoping the small end of one duct member 15 into the bifurcated large end of the next following duct member 15, the air discharge slots 21 are almost continuous. Thus, there is no interruption to the conveying of can bodies C along the conveyor 10.

It will be readily apparent that utilizing the conveyor 10, there is no jam up of the container bodies C along the conveyor 10, since there is provided a constant propellant means for the can bodies. Further, while the air moves the can bodies along the runway or track 11, the movement is at a relatively slow rate and this, together with the fact that the can bodies do not pile up, prevents damage to the can bodies as they are moved along the conveyor 10.

From the foregoing, it will be seen that novel and advantageous provision has been made for carrying out the desired end. However, attention is directed to the fact that variations may be made in the example conveyor apparatus disclosed herein without departing from the spirit and scope of the invention, as defined in the appended claims.

What is claimed as new:

1. A conveyor for can bodies comprising a track for receiving open ended can bodies for rolling movement therealong, said track being substantially horizontally disposed, and an air duct extending alongside said track generally the full length thereof, said air duct having an elongate air discharge slot disposed generally in a vertical plane for the horizontal discharge of air generally longitudinally of said track and into open ends of can bodies.

2. The conveyor of claim 1 wherein said track is secured to said duct by an adjustable bracket for adjusting the height of said track relative to said duct to center said air discharge slot relative to can bodies on said track.

3. A conveyor for can bodies comprising a track for receiving open ended can bodies for rolling movement therealong, said track being substantially horizontally disposed, and an air duct extending alongside said track generally the full length thereof, said air duct having an elongated air discharge slot disposed generally in a vertical plane for the horizontal discharge of air generally longitudinally of said track and into open ends of can bodies, said air duct being formed in sections, and each air duct section having separate blower means.

4. The conveyor of claim 3 wherein each air duct section tapers from the blower end thereof to the other end to provide for a uniform discharge of air through the air discharge slot thereof.

5. The conveyor of claim 3 wherein each air duct section tapers from the blower end thereof to the other end to provide for a uniform discharge of air through the air discharge slot thereof, the taper of said air duct in a vertical direction being symmetrical with relation to a horizontal plane passing through the center of said air discharge slot.

6. The conveyor of claim 3 wherein each air duct section tapers from the blower end thereof to the other end to provide for a uniform discharge of air through the air discharge slot thereof, the taper of said air duct in a vertical direction being symmetrical with relation to a horizontal plane passing through the center of said air discharge slot, and the taper of said air duct in a horizontal direction being towards said air discharge slot.

7. The conveyor of claim 3 wherein each air duct section tapers from the blower end thereof to the other end to provide for a uniform discharge of air through the air discharge slot thereof, the blower end of each air duct section being bifurcated and the blower means for each air duct section being in the form of spaced blower units.

8. The conveyor of claim 7 wherein each pair of blower units is driven by a single motor disposed between said blower units.

9. The conveyor of claim 3 wherein each air duct section tapers from the blower end thereof to the other end to provide for a uniform discharge of air through the air discharge slot thereof, the blower end of each air duct section being bifurcated, and the end of a next preceding air duct section being seated in said bifurcated end.

10. The conveyor of claim 3 wherein each air duct section tapers from the blower end thereof to the other end to provide for a uniform discharge of air through the air discharge slot thereof, the blower end of each air duct section being bifurcated, and the end of a next preceding air duct section being seated in said bifurcated end, said blower end having a recessed intermediate end wall portion, and said air duct other end including an end wall with the end wall of said air duct other end of the preceding duct being secured in face-to-face engagement with said intermediate end wall portion.

11. The conveyor of claim 3 wherein each air duct section tapers from the blower end thereof to the other end to provide for a uniform discharge of air through the air discharge slot thereof, and means carried by said air duct sections for varying the width of said air discharge slot.

References Cited in the file of this patent

UNITED STATES PATENTS

| | | |
|---|---|---|
| 2,342,680 | Melzer | Feb. 29, 1944 |
| 2,515,894 | Polk | July 18, 1950 |
| 2,678,237 | Allender | May 11, 1954 |
| 2,778,691 | Hazel | Jan. 22, 1957 |
| 2,781,232 | Smith | Feb. 12, 1957 |

FOREIGN PATENTS

| | | |
|---|---|---|
| 495,957 | Belgium | Sept. 16, 1950 |